US012496820B2

(12) United States Patent
Kasai et al.

(10) Patent No.: US 12,496,820 B2
(45) Date of Patent: *Dec. 16, 2025

(54) ELEMENT SUBSTRATE, LIQUID DISCHARGE HEAD, AND PRINTING APPARATUS

(71) Applicant: CANON KABUSHIKI KAISHA, Tokyo (JP)

(72) Inventors: Ryo Kasai, Tokyo (JP); Yosuke Miura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,213

(22) Filed: Jan. 23, 2023

(65) Prior Publication Data

US 2023/0158795 A1 May 25, 2023

Related U.S. Application Data

(62) Division of application No. 16/847,800, filed on Apr. 14, 2020, now Pat. No. 11,584,122.

(30) Foreign Application Priority Data

May 22, 2019 (JP) ................................ 2019-096246

(51) Int. Cl.
*B41J 2/045* (2006.01)

(52) U.S. Cl.
CPC ......... *B41J 2/04541* (2013.01); *B41J 2/0458* (2013.01)

(58) Field of Classification Search
CPC . B41J 2/04541; B41J 2/04543; B41J 2/04573
See application file for complete search history.

(56) References Cited

U.S. PATENT DOCUMENTS 5,173,717 A * 12/1992 Kishida ................ B41J 2/04581 347/56
5,790,140 A 8/1998 Koizumi et al.
(Continued)

FOREIGN PATENT DOCUMENTS

CN 1350924 A 5/2002
CN 1522858 A 8/2004
(Continued)

OTHER PUBLICATIONS

Chinese Office Action issued on Jan. 6, 2022, in counterpart application CN 202010430414.3. (18 pages).
(Continued)

*Primary Examiner* — Lam S Nguyen
(74) *Attorney, Agent, or Firm* — VENABLE LLP

(57) ABSTRACT

An element substrate according to an embodiment of the present invention includes a plurality of print elements and a plurality of drive elements for driving the plurality of print elements. The element substrate comprises a generation circuit configured to generate a first drive signal that drives drive elements belonging to a first group among the plurality of drive elements, and a second drive signal that drives drive elements belonging to a second group among the plurality of drive elements, using a selector configured to switch a signal transmitted from outside of the element substrate and an output destination of the signal within one block period in driving the plurality of drive elements by dividing the plurality of elements into the plurality of blocks. The first drive signal and the second drive signal are generated at different timings.

10 Claims, 9 Drawing Sheets

(56) References Cited

U.S. PATENT DOCUMENTS

| | | | |
|---|---|---|---|
| 5,873,663 | A | 2/1999 | Yokoi et al. |
| 6,224,184 | B1 | 5/2001 | Imanaka et al. |
| 6,290,334 | B1 * | 9/2001 | Ishinaga ................ B41J 2/3551 347/57 |
| 6,296,340 | B1 * | 10/2001 | Tajika .................. B41J 2/04591 347/11 |
| 6,382,755 | B1 | 5/2002 | Imanaka et al. |
| 6,481,817 | B1 | 11/2002 | Torgerson et al. |
| 6,890,060 | B2 | 5/2005 | Yakura et al. |
| 7,090,321 | B2 | 8/2006 | Koyama |
| 7,364,247 | B2 | 4/2008 | Iwao et al. |
| 7,600,839 | B2 | 10/2009 | Akama et al. |
| 7,722,145 | B2 | 5/2010 | Kubota |
| 7,810,892 | B2 | 10/2010 | Yamaguchi et al. |
| 8,342,620 | B2 | 1/2013 | Kasai et al. |
| 8,851,603 | B2 | 10/2014 | Hashiguchi |
| 10,118,385 | B2 | 11/2018 | Umeda |
| 10,457,043 | B2 | 10/2019 | Furukawa |
| 2003/0142153 | A1 | 7/2003 | Nakajima et al. |
| 2004/0212647 | A1 | 10/2004 | Yakura et al. |
| 2004/0223012 | A1 | 11/2004 | Koyama |
| 2005/0219290 | A1 | 10/2005 | Iwao et al. |
| 2007/0153036 | A1 | 7/2007 | Akama et al. |
| 2008/0111864 | A1 | 5/2008 | Yamaguchi et al. |
| 2008/0158276 | A1 | 7/2008 | Kubota |
| 2009/0278879 | A1 | 11/2009 | Takeuchi et al. |
| 2011/0273498 | A1 | 11/2011 | Kasai et al. |
| 2013/0016146 | A1 | 1/2013 | Hashiguchi |
| 2018/0086057 | A1 | 3/2018 | Umeda |
| 2018/0370224 | A1 * | 12/2018 | Osuki .................. B41J 2/04541 |
| 2019/0092001 | A1 | 3/2019 | Furukawa |

FOREIGN PATENT DOCUMENTS

| | | | |
|---|---|---|---|
| CN | 1672934 | A | 9/2005 |
| CN | 101181841 | A | 5/2008 |
| CN | 101209616 | A | 7/2008 |
| CN | 102821961 | A | 12/2012 |
| CN | 107867072 | A | 4/2018 |
| CN | 109572213 | A | 4/2019 |
| EP | 0674993 | A2 | 10/1995 |
| JP | 7-290707 | A | 11/1995 |
| JP | 7-309007 | A | 11/1995 |
| JP | 4797313 | B2 | 10/2011 |
| JP | 4880994 | B2 | 2/2012 |
| JP | 5473767 | A | 4/2014 |
| JP | 2019-6110 | A | 1/2019 |
| WO | 2001/53102 | A1 | 7/2001 |

OTHER PUBLICATIONS

Extended Search Report dated Oct. 1, 2020, in counterpart application EP 20172112.3 (11 pages).

* cited by examiner

ELEMENT SUBSTRATE, LIQUID DISCHARGE HEAD, AND PRINTING APPARATUS

CROSS-REFERENCE TO RELATED APPLICATIONS

This application is a continuation of U.S. patent application Ser. No. 16/847,800, filed on Apr. 14, 2020, which claims the benefit of priority from Japanese Application No. 2019-096246 filed May 22, 2019. The contents of the aforementioned applications are incorporated herein by reference in their entireties.

BACKGROUND OF THE INVENTION

Field of the Invention

The present invention relates to an element substrate, a liquid discharge head, and a printing apparatus, and particularly to, for example, an element substrate integrating a plurality of drive elements and drive circuits for driving the respective elements, a printhead for performing printing in accordance with an inkjet method using the element substrate, and a printing apparatus using the printhead.

Description of the Related Art

In general, a printing apparatus that prints desired information such as characters or images on a sheet-like print medium such as a sheet or a film is widely used as an information output apparatus in, for example, a word processor, a personal computer, or a facsimile.

The arrangement of a head substrate used in such printing apparatus will be described by exemplifying a head substrate according to an inkjet method of performing printing using thermal energy. An inkjet printhead performs printing by providing, as a print element, an electrothermal transducer (heater) in a portion that communicates with each orifice which discharges an ink droplet, and discharging an ink droplet by ink film boiling caused by supplying a current to the electrothermal transducer to generate heat. It is easy to densely arrange a number of orifices and electrothermal transducers (heaters) in the printhead, thereby making it possible to obtain a high-resolution print image.

Along with a recent increase in printing speed, the number of print elements driven in the element substrate tends to increase, and power supply to the element substrate becomes problematic. To solve this problem, the print elements are time-divisionally driven to suppress a current peak flowing into the element substrate. In addition, as described in Japanese Patent No. 4880994, a drive timing is further shifted in a time-division block period, thereby suppressing the current peak. To shift a drive timing in a time-division block period, it is necessary to divide, into two groups, the print elements to be driven by two drive signals, and thus the number of drive signals unwantedly increases by a factor of two. This indicates an increase in number of input terminals provided in the element substrate, and an increase in manufacturing cost of the element substrate is thus concerned.

As a method of suppressing an increase in number of terminals caused by an increase in number of drive signals, there is provided a method, described in Japanese Patent No. 5473767, of providing a circuit that generates a drive signal in an element substrate. In this method, it is possible to drive a print element without providing a drive signal terminal by transmitting data indicating the pulse width of a drive signal and counting edges of the signal pulse of a clock signal used for data transfer. However, if an attempt is made to generate two drive signals in this method, an area occupied by a drive signal generation circuit in the element substrate doubles, and the size of the element substrate increases, resulting in an increase in manufacturing cost.

SUMMARY OF THE INVENTION

Accordingly, the present invention is conceived as a response to the above-described disadvantages of the conventional art.

For example, an element substrate, a liquid discharge head, and a printing apparatus according to this invention are capable of internally generating a plurality of drive signals to be used to drive drive elements with an inexpensive arrangement.

According to one aspect of the present invention, there is provided an element substrate, including a plurality of print elements and a plurality of drive elements configured to drive the plurality of print elements, for driving the plurality of drive elements by dividing the plurality of drive elements into a plurality of blocks, the element substrate comprising: a generation circuit configured to generate a first drive signal that drives drive elements belonging to a first group among the plurality of drive elements, and a second drive signal that drives drive elements belonging to a second group among the plurality of drive elements, using a first selector configured to switch a signal transmitted from outside of the element substrate and an output destination of the signal within one block period in driving the plurality of drive elements by dividing the plurality of drive elements into the plurality of blocks, wherein the first drive signal and the second drive signal are generated at different timings.

According to another aspect of the present invention, there is provided a liquid discharge head using the element substrate with the above arrangement, comprising a plurality of orifices for discharging a liquid.

According to still another aspect of the present invention, there is provided a printing apparatus for printing on a print medium using the above liquid discharge head as a printhead for discharging the liquid as ink, discharging the ink from the orifices by driving the plurality of print elements.

The invention is particularly advantageous since a plurality of drive signals can be generated by one generation circuit and thus the element substrate can be manufactured at low cost. In addition, the drive elements can be driven using a plurality of drive signals even in a division block by time-divisional driving, and it is therefore possible to reduce the current peak along with driving.

Further features of the present invention will become apparent from the following description of exemplary embodiments (with reference to the attached drawings).

DESCRIPTION OF THE EMBODIMENTS

Figure 1:
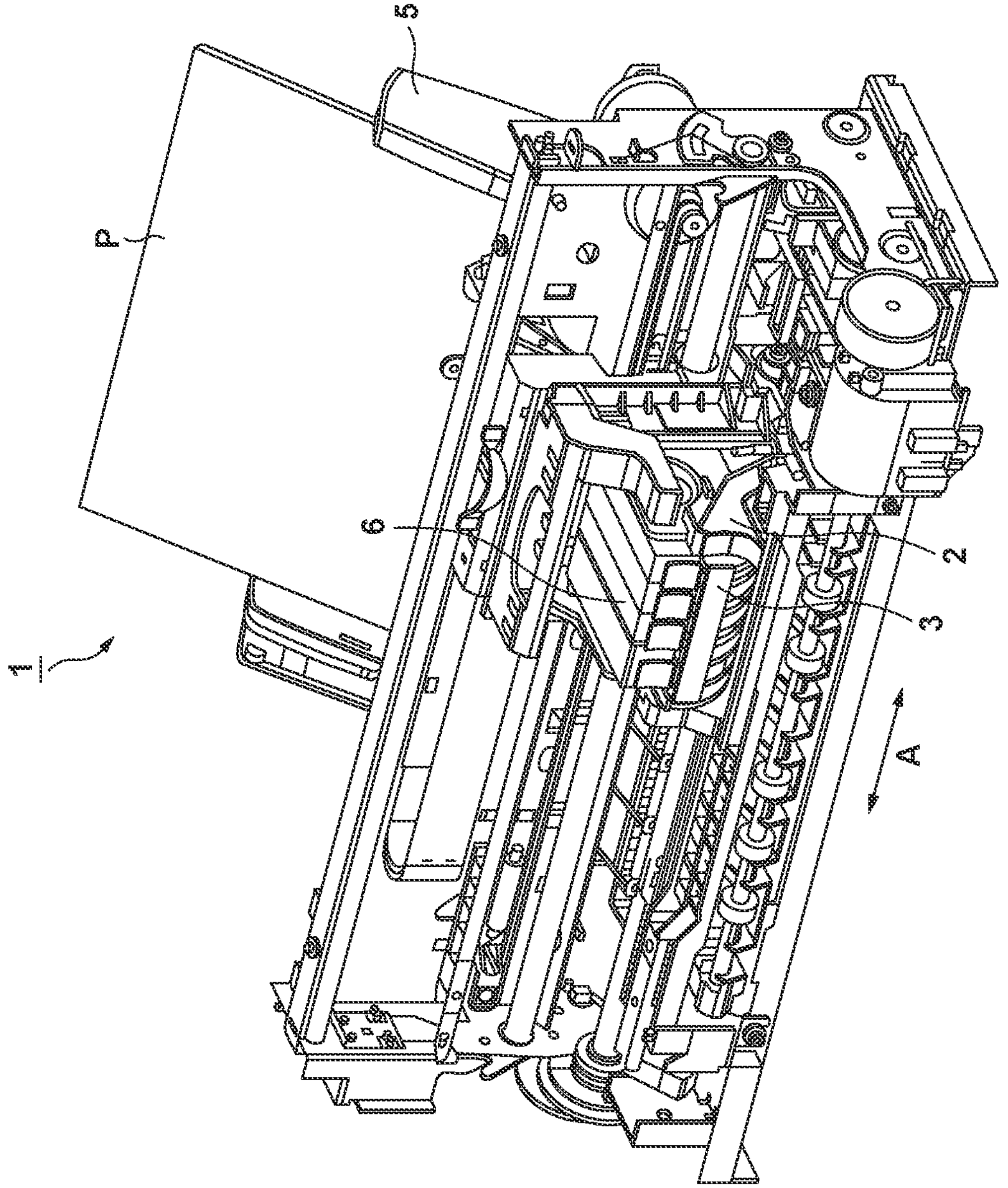
FIG. 1 is a perspective view showing the schematic arrangement of a printing apparatus including a printhead according to an exemplary embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, a "nozzle" (to be also referred to as "print element" hereinafter) generically means an ink orifice or a liquid channel communicating with it, and an element for generating energy used to discharge ink, unless otherwise specified.

An element substrate for a printhead (head substrate) used below means not merely a base made of a silicon semiconductor, but an arrangement in which elements, wirings, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

<Description of Outline of Printing Apparatus (FIGS. 1 and 2)>

FIG. 1 is an external perspective view showing the outline of the arrangement of a printing apparatus that performs printing using an inkjet printhead according to an exemplary embodiment of the present invention.

As shown in FIG. 1, in an inkjet printing apparatus (to be referred to as a printing apparatus hereinafter) 1, an inkjet printhead (to be referred to as a printhead hereinafter) 3 configured to discharge ink in accordance with an inkjet method to perform printing is mounted on a carriage 2. The carriage 2 is reciprocally moved in the direction of an arrow A to perform printing. A print medium P such as print paper is fed via a paper feed mechanism 5 and conveyed to a printing position, and ink is discharged from the printhead 3 to the print medium P at the printing position, thereby performing printing.

In addition to the printhead 3, an ink tank 6 storing ink to be supplied to the printhead 3 is attached to the carriage 2 of the printing apparatus 1. The ink tank 6 is detachable from the carriage 2.

A printing apparatus 1 shown in FIG. 1 can perform color printing, and for the purpose, four ink cartridges storing magenta (M), cyan (C), yellow (Y), and black (K) inks, respectively, are mounted on the carriage 2. The four ink cartridges are detachable independently.

The printhead 3 according to this embodiment employs an inkjet method of discharging ink using thermal energy. Hence, the printhead 3 includes an electrothermal transducer (heater). The electrothermal transducer is provided in correspondence with each orifice. A pulse voltage is applied to a corresponding electrothermal transducer in accordance with a print signal, thereby discharging ink from a corresponding orifice. Note that the printing apparatus is not limited to the above-described serial type printing apparatus, and the embodiment can also be applied to a so-called full line type printing apparatus in which a printhead (line head) with orifices arrayed in the widthwise direction of a print medium is arranged in the conveyance direction of the print medium.

Figure 2:
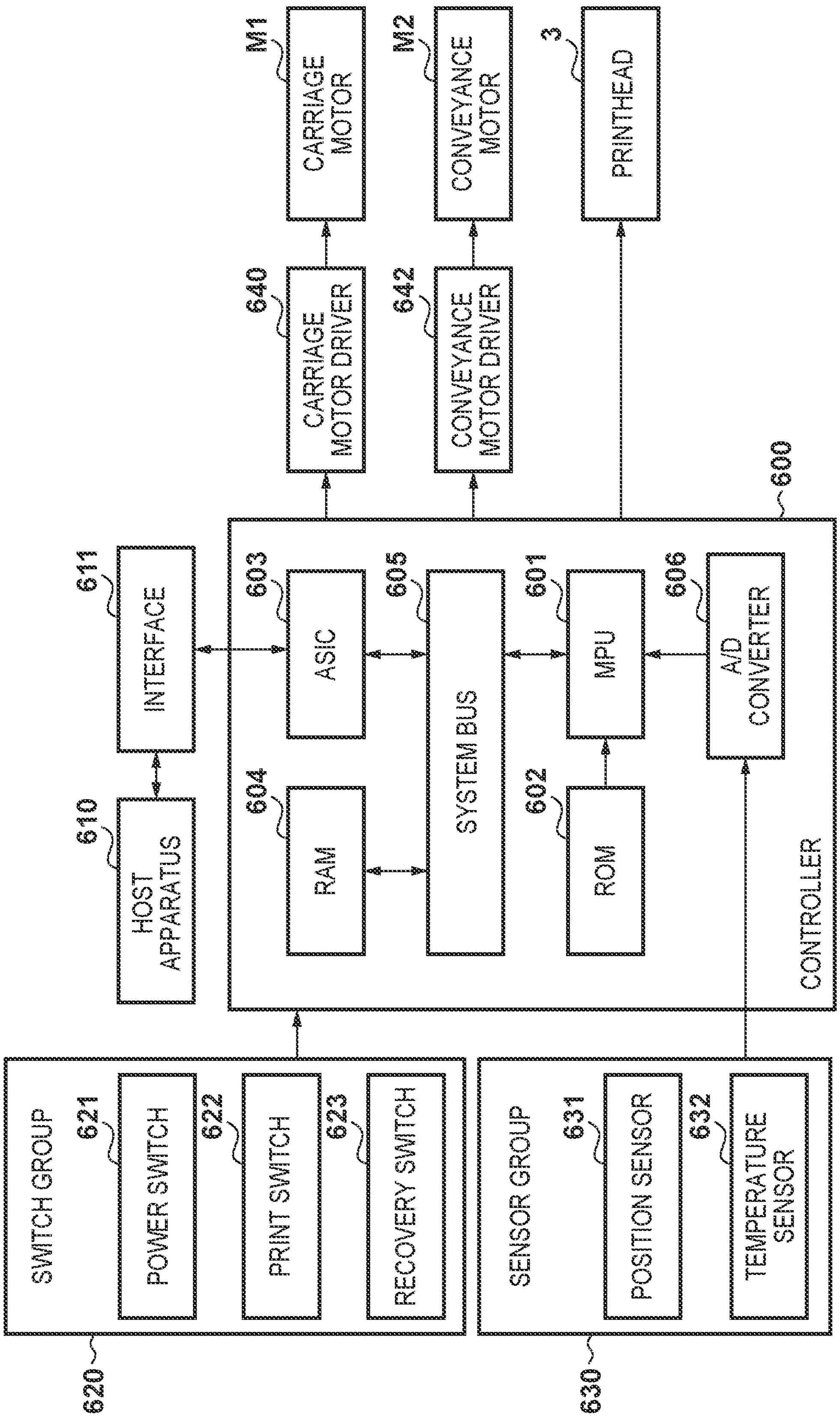
FIG. 2 is a block diagram showing the control configuration of the printing apparatus shown in FIG. 1.

FIG. 2 is a block diagram showing the control configuration of the printing apparatus shown in FIG. 1.

As shown in FIG. 2, a controller 600 is formed by an MPU 601, a ROM 602, an application specific integrated circuit (ASIC) 603, a RAM 604, a system bus 605, an A/D converter 606, and the like. Here, the ROM 602 stores programs corresponding to control sequences to be described later, necessary tables, and other fixed data. The ASIC 603 generates control signals for control of a carriage motor M1, control of a conveyance motor M2, and control of the printhead 3. The RAM 604 is used as an image data expansion area, a working area for program execution, and the like. The system bus 605 connects the MPU 601, the ASIC 603, and the RAM 604 to each other to exchange data. The A/D converter 606 receives an analog signal from a sensor group to be described below, performs A/D conversion, and supplies a digital signal to the MPU 601.

Additionally, referring to FIG. 2, reference numeral 610 denotes a host apparatus corresponding to a host shown in FIG. 1 or an MFP, which serves as an image data supply source. Image data, commands, statuses, and the like are transmitted/received by packet communication between the host apparatus 610 and the printing apparatus 1 via an interface (I/F) 611. Note that as the interface 611, a USB interface may be provided independently of a network interface to receive bit data or raster data serially transferred from the host.

Reference numeral 620 denotes a switch group which is formed by a power switch 621, a print switch 622, a recovery switch 623, and the like.

Reference numeral 630 denotes a sensor group configured to detect an apparatus state and formed by a position sensor 631, a temperature sensor 632, and the like.

Reference numeral 640 denotes a carriage motor driver that drives the carriage motor M1 configured to reciprocally scan the carriage 2 in the direction of the arrow A; and 642, a conveyance motor driver that drives the conveyance motor M2 configured to convey the print medium P.

The ASIC 603 transfers data used to drive an electrothermal transducer (a heater for ink discharge) to the printhead while directly accessing the storage area of the RAM 604 at the time of print scan by the printhead 3. In addition, the printing apparatus includes a display unit formed by an LCD or an LED as a user interface.

Figure 3:
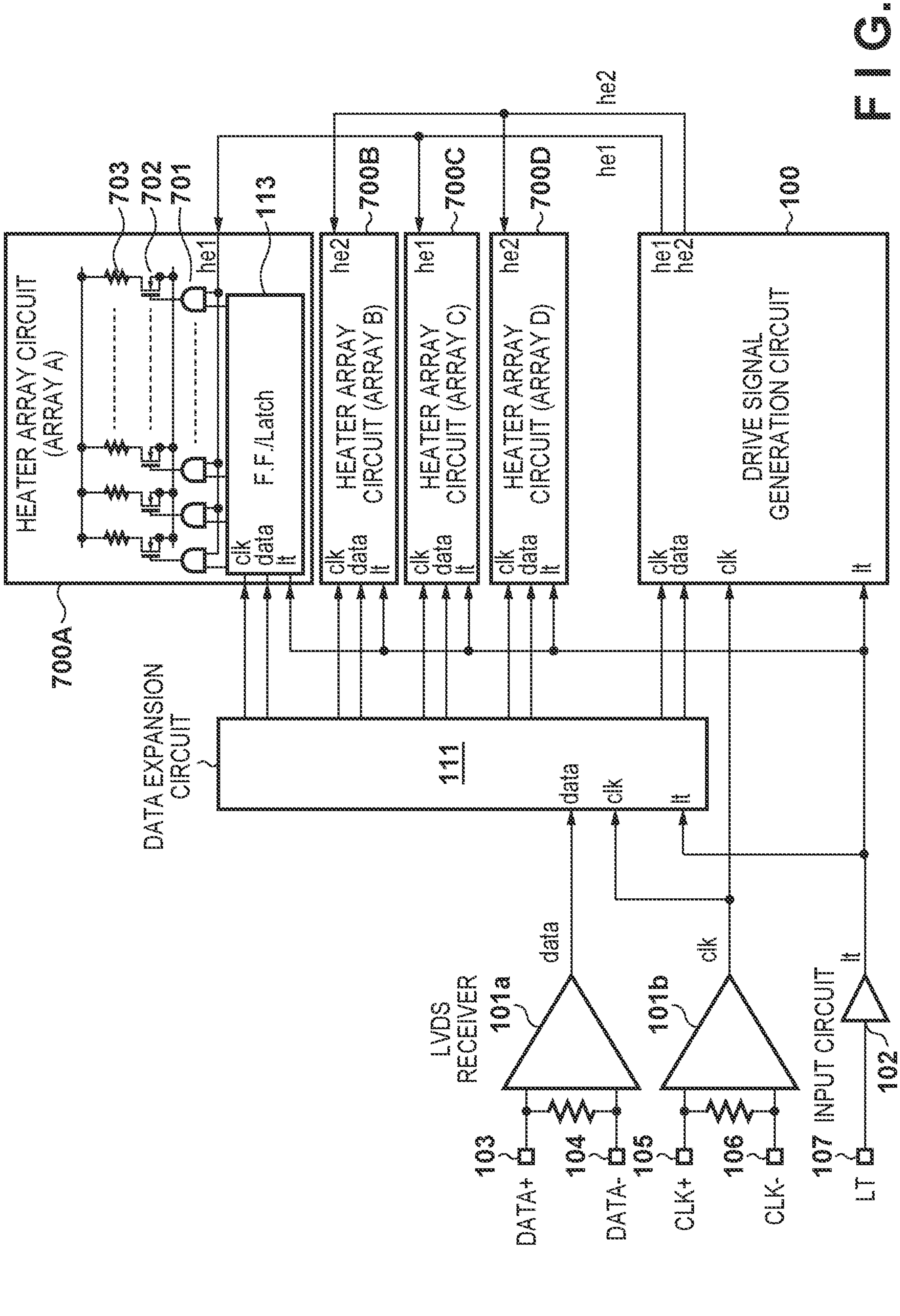
FIG. 3 is a circuit diagram showing the schematic arrangement of an element substrate (head substrate) integrated in the printhead.

FIG. 3 is a circuit diagram showing the schematic arrangement of an element substrate (head substrate) integrated in the printhead.

The number of nozzles (print elements) provided in the printhead 3 is normally several hundreds to several thousands, and thus large power is required to concurrently drive the print elements. To cope with this, a method of dividing the plurality of print elements into a plurality of blocks and time-divisionally driving, for each block, drive elements belonging to the block is adopted. Furthermore, the plurality of print elements are implemented by being arrayed not in one array but in a plurality of arrays on the element substrate. In the example shown in FIG. 3, the plurality of nozzles (print elements) are implemented by being divided and arrayed in four arrays, and heater array circuits 700A, 700B, 700C, and 700D that drive the nozzles of the arrays, respectively, are provided. The four heater array circuits have the same arrangement, and the heater array circuit 700A will be described as an example.

Note that the four nozzle arrays corresponding to the four heater arrays (print element arrays) are assigned as nozzle arrays that discharge magenta (M), cyan (C), yellow (Y), and black (K) inks, respectively, for full color printing. In addition, the four nozzle arrays corresponding to the four heater arrays may be arranged by being shifted by an interval of ¼ nozzle in the nozzle array direction to perform high-resolution printing by discharging one color ink. In this case, for full color printing, the four element substrates shown in FIG. 3 are provided in the printhead. As described above, the element substrate includes a plurality of heater arrays (print element arrays).

As shown in FIG. 3, the heater array circuit 700A includes a plurality of print elements (heaters) 703 each for heating ink in a corresponding nozzle to be discharged, and a plurality of driver transistors (drive elements) 702 each for driving a corresponding one of the plurality of heaters 703. As the driver transistor, a transistor such as a MOSFET is used. Furthermore, the heater array circuit 700A includes logic circuits (AND circuits in this example) 701 that operate by signals transmitted from the outside (the main body portion of the printing apparatus), and a flip-flop circuit (shift resistor)/latch circuit (F.F/Latch) 113.

As is apparent from FIG. 3, this element substrate adopts an arrangement of receiving data from the controller 600 of the printing apparatus using an LVDS (Low Voltage Differential Signaling) method. Therefore, the element substrate includes two LVDS receivers 101*a* and 101*b*. The LVDS receiver 101*a* receives data signals (DATA+ and DATA−) at input terminals 103 and 104, and the LVDS receiver 101*b* receives clock signals (CLK+ and CLK−) at input terminals 105 and 106. Note that a latch signal (LT) is received as a normal serial signal at an input terminal 107, and is amplified by an input circuit (OP amplifier) 102.

Figure 4:
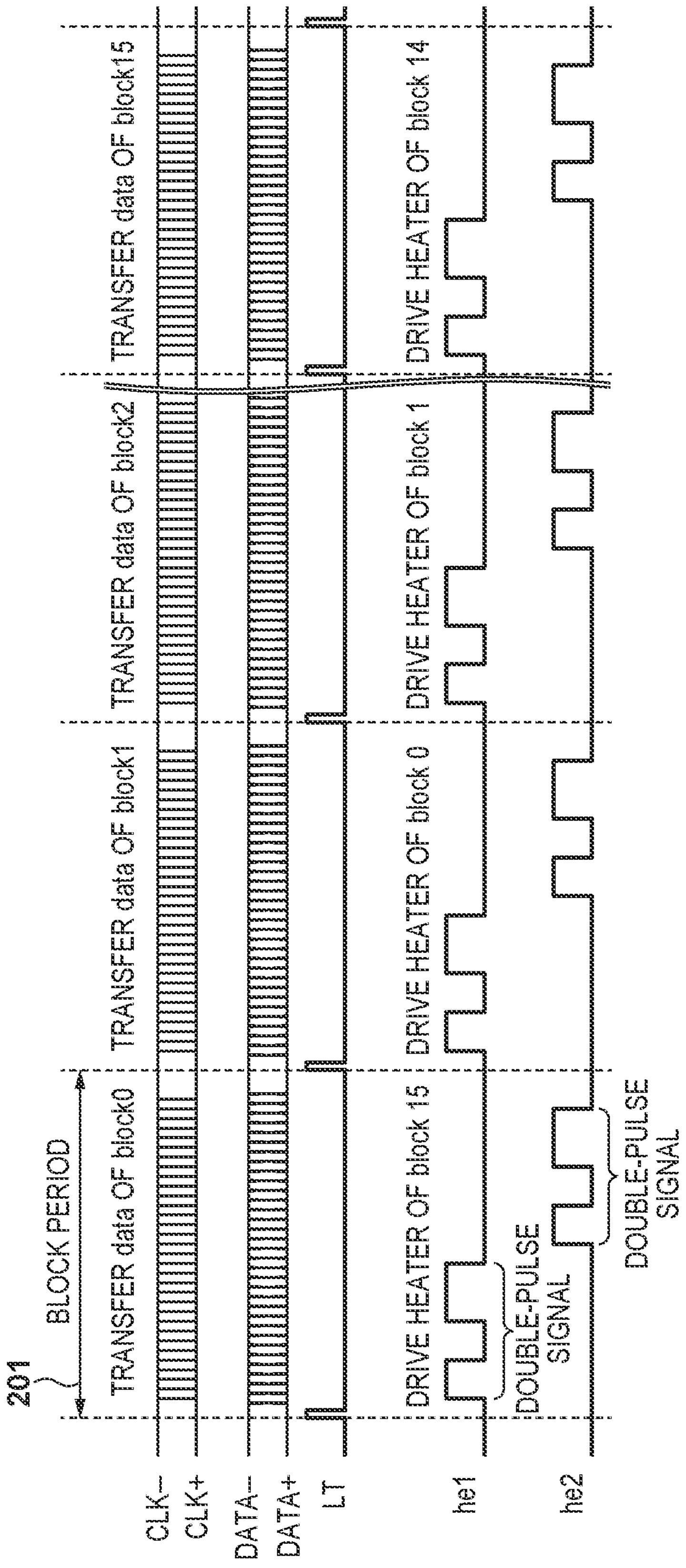
FIG. 4 is a timing chart of signals received by an LVDS method and signals generated by the internal circuit of the element substrate.

FIG. 4 is a timing chart of signals received by the LVDS method and signals generated by the internal circuit of the element substrate. FIG. 4 shows an example of time-divisionally driving the plurality of drive elements corresponding to the plurality of nozzles (print elements) by dividing the drive elements into 16 blocks (blocks 0 to 15).

As shown in FIG. 4, in time-divisional driving, data transfer and driving of the print elements are simultaneously performed in each block period 201. Thus, during the block period 201, the main body portion of the printing apparatus transfers the data signals (DATA+ and DATA−) as differential signals in synchronism with clock signals (CLK+ and CLK−) as differential signals. These differential signals are converted into single-ended internal signals clk and data by the LVDS receivers 101*a* and 101*b*, and transferred to a data expansion circuit 111, as shown in FIG. 3. The internal signal clk is also transferred to a drive signal generation circuit 100. The data expansion circuit 111 distributes and transfers the internal signals clk and data to the flip-flop/latch circuits of the heater array circuits 700A to 700D.

On the other hand, the latch signal LT input for every block period is amplified by the OP amplifier 102, and transferred, as an internal signal lt, to the data expansion circuit 111, the drive signal generation circuit 100, and the flip-flop/latch circuits of the heater array circuits 700A to 700D.

At a timing when the pulse of the latch signal LT is set to Hi (high level), the transferred internal signal data is stored and held in each of the heater array circuits 700A to 700D, and the nozzle (print element) to be driven is selected.

In the next block period, the driver transistors 702 are driven in accordance with pulse widths defined by double-pulse drive signals he1 (first drive signal) and he2 (second drive signal) generated by the drive signal generation circuit 100. As a result, the desired heaters 703 are heated to execute printing. In the example shown in FIG. 3, the drive elements of the heater array circuits 700A and 700C are driven by the drive signal he1 and the drive elements of the heater array circuits 700B and 700D are driven by the drive signal he2. In the example shown in FIG. 4, based on data input in association with block 0, the heaters corresponding to block 0 are driven in the next block period. The same applies to blocks 1, 2, . . . , 15.

Note that in the example shown in FIGS. 3 and 4, since it takes long time to perform data transfer with respect to the pulse width of the drive signal, the drive signals he1 and he2 are generated at different timings and distributed for each heater array circuit, like the drive signals he1 and he2 in the block period 201. This suppresses a peak current flowing into the element substrate. However, such distribution may be performed in the same heater array.

Embodiments within the element substrate integrated in the printhead mounted on the printing apparatus having the above arrangement will be described next.

First Embodiment

Figure 5:
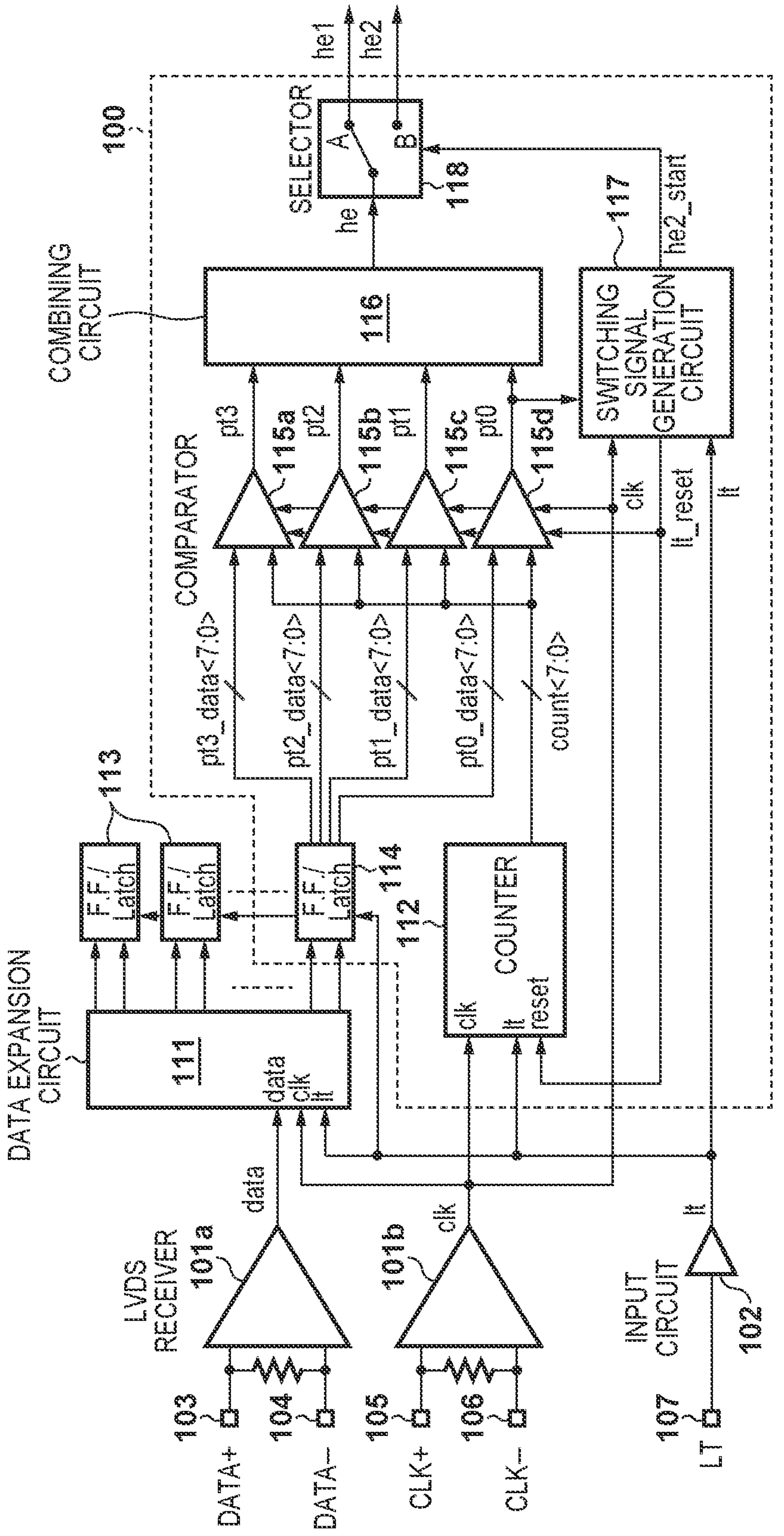
FIG. 5 is a circuit diagram showing the detailed arrangement of a drive signal generation circuit according to the first embodiment.

FIG. 5 is a circuit diagram showing the detailed arrangement of a drive signal generation circuit according to the first embodiment provided in an element substrate. Note that the same reference numerals as already described with reference to FIG. 3 denote the similar constituent elements in FIG. 5, and a description thereof will be omitted.

Figure 6:
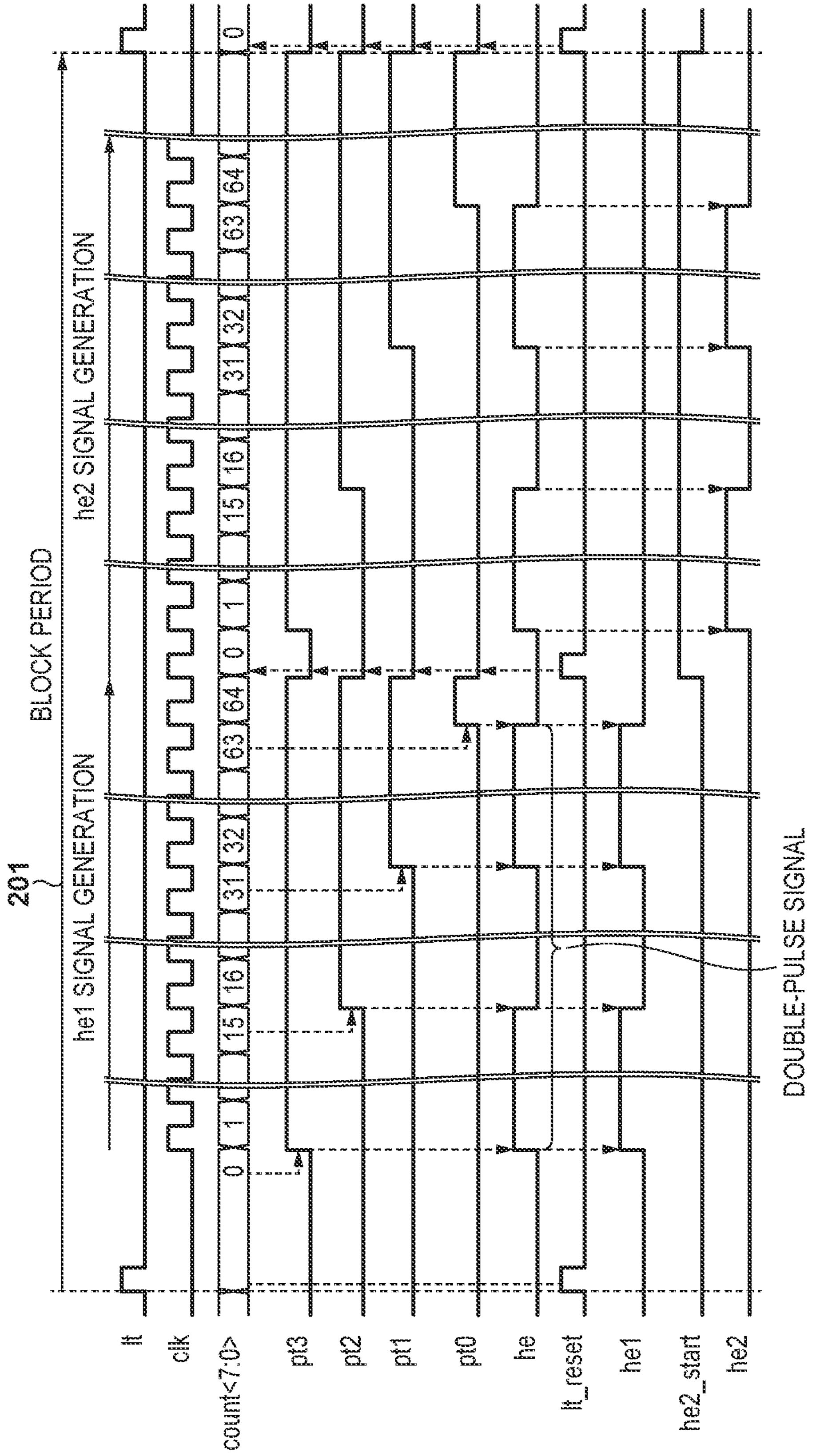
FIG. 6 is a detailed signal timing chart within one block period shown in FIG. 4.

FIG. 6 is a detailed signal timing flowchart of one block period (one cycle) shown in FIG. 4.

As shown in FIG. 5, a drive signal generation circuit 100 is formed by a flip-flop/latch circuit 114 storing pulse width data, a counter 112, comparators 115*a* to 115*d*, a combining circuit 116, a selector 118, and a switching signal generation circuit (reset circuit) 117. The pulse width data is included in a data signal data of an internal signal generated by input differential data signals (DATA+ and DATA−).

The counter 112 is an 8-bit synchronous counter, and counts leading edges of a clock signal clk using a data transfer timing. The comparators 115*a* to 115*d* compare pulse width data pt0_data, pt1_data, pt2_data, and pt3_data with a count value count<7:0> of the counter 112, respectively. If each 8-bit pulse width data matches the count value, each of the comparators 115*a* to 115*d* outputs Hi at the timing of the leading edge of the next clock signal clk.

FIG. 6 shows a state in which when the count value count<7:0> is "0", "15", "31", or "63", an output pt3, pt2, pt1, or pt0 of the comparator 115*a*, 115*b*, 115*c*, or 115*d* is at Hi. In other words, in this case, the pulse width data pt3_data, pt2_data, pt1_data, and pt0_data respectively having values of "0", "15", "31", and "63" are input to the comparators 115*a* to 115*d*, respectively.

The output signals pt3, pt2, pt1, and pt0 of the comparators 115*a* to 115*d* are logically inverted from Low (low level) to Hi in this order, as shown in FIG. 6, and then the combining circuit (drive pulse generation circuit) 116 generates a double-pulse signal he. To generate a double-pulse signal, it is necessary to define the leading edges and trailing edges of two signals, that is, a prepulse and a main pulse. The timings at which the output signals of the four comparators 115*a* to 115*d* are inverted into Hi define the leading edges and trailing edges.

In this example, the pulse widths of the prepulse and main pulse of the generated double-pulse signal he correspond to 15 pulses and 32 pulses of the clock signal clk, respectively. However, it is possible to generate the double-pulse signal he having a desired pulse width by changing the values of the pulse width data pt3_data, pt2_data, pt1_data, and pt0_data.

In the first drive signal generation operation, the selector 118 selects the A side, and the double-pulse signal he is output as the drive signal he1 and input to heater array circuits 700A to 700D.

The switching signal generation circuit 117 is a circuit that detects the end of the drive signal he1 and generates a signal for regenerating a drive signal. That is, as shown in FIG. 6, a timing at which the signal pt0 corresponding to the trailing pulse of the drive signal he1 is at Hi is detected to generate a signal he2_start and a latch reset signal lt_reset.

As shown in FIG. 6, the signal he2_start is a signal that is set to Hi at the leading edge of the clock signal clk next to the clock signal clk at which the signal pt0 is set to Hi, and causes the selector 118 to select the B side to switch the output of the drive signal generation circuit 100 to the drive signal he2. That is, the selector 118 switches the output destination of the signal. Similarly, the latch reset signal lt_reset is a signal that is set to Hi at the leading edge of the clock signal clk next to the clock signal clk at which the signal pt0 is set to Hi, and is set to Lo at the trailing edge of the next clock signal clk.

The latch reset signal lt_reset resets the count value of the counter 112 to "0", and also resets the outputs of the comparators 115*a* to 115*d* to Lo. This causes the drive signal generation circuit 100 to operate again, thereby outputting the drive signal he2 having the same pulse width as that of the drive signal he1.

As described above, it is possible to generate the two drive signals he1 and he2 in one block period 201 by causing the counter 112 of one drive signal generation circuit 100 to operate for two cycles.

If an attempt is made to generate the drive signals he1 and he2 by two drive signal generation circuits, it is necessary to count a shift time, and it is thus necessary to fully count the clock signal clk in the block period 201.

As described above, according to this embodiment, the counter 112 operates for two cycles in one block period, and thus need only count up to half of one block period. That is, as compared with a case in which two drive signal generation circuits are provided, the counter can be decreased by one bit, and a single drive signal generation circuit can deal with this. Thus, it is possible to implement a similar function with a circuit area which is half or less of the circuit area of the two drive signal generation circuits, and also increase the speed of the counter operation. Furthermore, since the number of count bits decreases, the pulse width data can also be reduced, and the transfer data amount can be suppressed, contributing to an increase in speed of processing.

Note that in the above-described embodiment, the counter is operated for two cycles in one drive signal generation circuit. However, if the pulse width of the drive signal he is sufficiently small with respect to the block period 201, the counter may be operated for three or more cycles. Note that in this case, it is necessary to increase the number of selection channels of the selector 118.

In addition, the double-pulse signal has been explained as the drive signal he. However, the present invention may use a single-pulse drive signal he. In this case, any two of the comparators 115*a* to 115*d* are used, and it is therefore possible to reduce the number of comparators. The example in which the drive signal he1 is input to the heater array circuits 700A and 700C and the drive signal he2 is input to the heater array circuits 700B and 700D has been explained. The present invention, however, is not limited to this. That is, the present invention is applicable to a case in which among the plurality of heaters included in one heater array circuit 700A, heaters belonging to the first group are driven by the drive signal he1 and heaters belonging to the second group are driven by the drive signal he2.

Second Embodiment

In the first embodiment, as indicated by FIG. 6, the example when the pulse widths of the drive signals he1 and he2 are equal to each other has been explained. An example when the pulse widths of drive signals he1 and he2 are different from each other will now be described.

Figure 7:
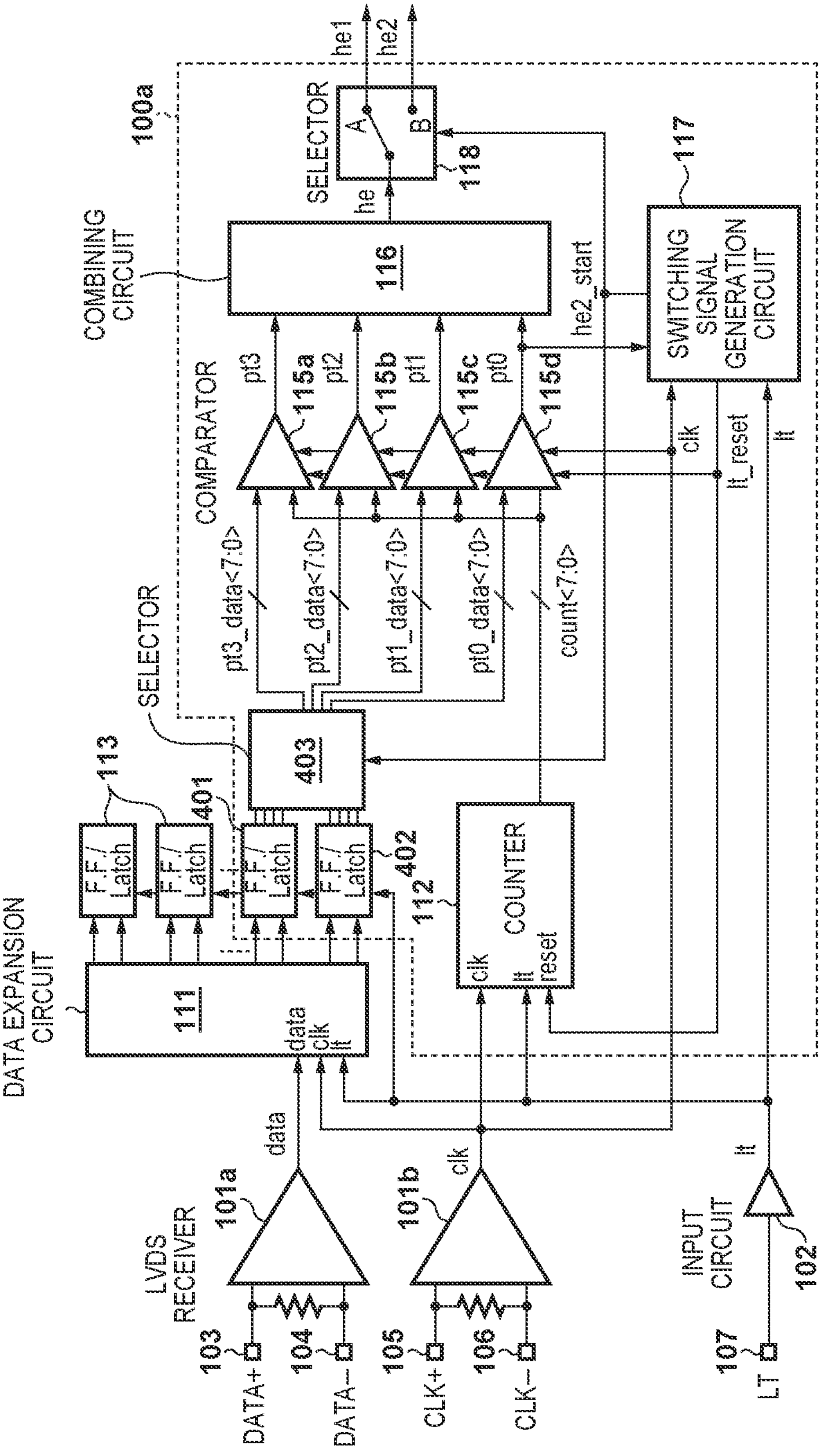
FIG. 7 is a circuit diagram showing the detailed arrangement of a drive signal generation circuit according to the second embodiment.

FIG. 7 is a circuit diagram showing the detailed arrangement of a drive signal generation circuit 100*a*, included in an element substrate, according to the second embodiment. Note that the same reference numerals as already described with reference to FIGS. 3 and 5 denote the similar constituent elements in FIG. 7, and a description thereof will be omitted. Only an arrangement unique to this embodiment will be described here.

As shown in FIG. 7, in this embodiment, a selector 403 and flip-flop/latch circuits 401 and 402 storing data used to generate the drive signals he1 and he2, respectively, are provided. The basic operation of a drive signal generation circuit 100*a* is the same as in the first embodiment. In this embodiment, however, a signal he2 start output by detecting the trailing edge of the drive signal he1 is also input to the selector 403. By a selection operation of the selector 403, the pulse width data of the drive signal he1 is input to comparators 115*a* to 115*d* during the generation period of the drive signal he1, and is switched to the pulse width data of the drive signal he2 during the generation period of the drive signal he2.

According to the above-described embodiment, therefore, the drive signals he1 and he2 can be generated and output as signals having any desired pulse widths, respectively. Note that in this embodiment, since the selector 403 and the flip-flop/latch circuits 401 and 402 are added, the circuit size accordingly increases. However, a circuit scale is about half of that when two drive signal generation circuits are implemented, and it is possible to obtain the same effect as in the first embodiment.

Note that in this embodiment as well, a counter is operated for two cycles in one drive signal generation circuit. However, if the pulse width of a drive signal he is sufficiently small with respect to a block period 201, the counter may be operated for three or more cycles. In this case, it is necessary to increase the number of selection channels of the selector 403, and to add flip-flop/latch circuits accordingly.

Third Embodiment

In the first and second embodiments, the count value and the pulse data value are compared with each other using the counter and the comparator, thereby generating a pulse. However, this embodiment adopts an arrangement in which a count value is directly set in a counter without using any comparator, and is counted down.

Figure 8:
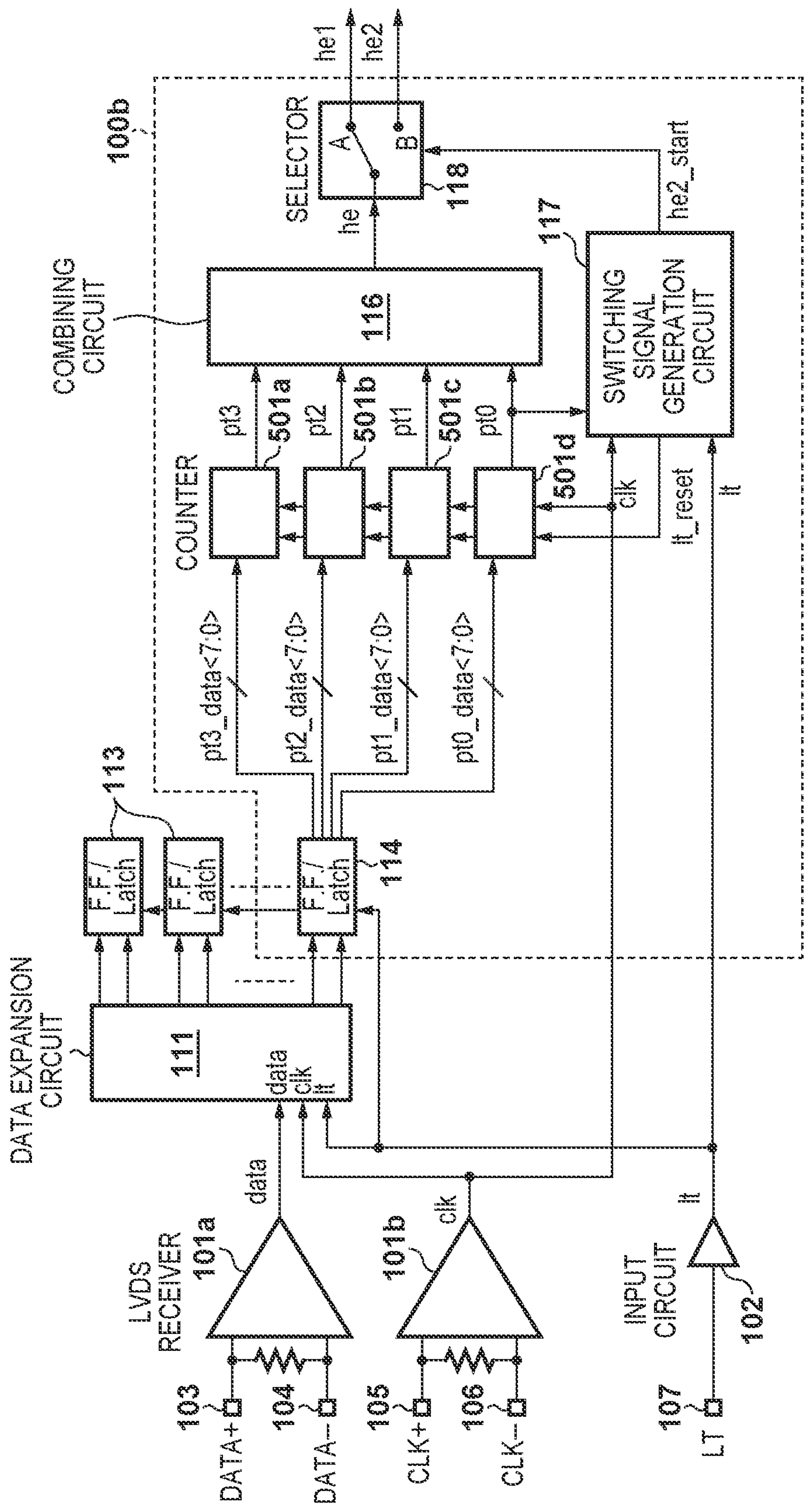
FIG. 8 is a circuit diagram showing the detailed arrangement of a drive signal generation circuit according to the third embodiment.

FIG. 8 is a circuit diagram showing the detailed arrangement of a drive signal generation circuit 100*b*, included in an element substrate, according to the third embodiment. Note that the same reference numerals as already described with reference to FIGS. 3 and 5 denote the similar constituent elements in FIG. 8, and a description thereof will be omitted. Only an arrangement unique to this embodiment will be described here.

Figure 9:
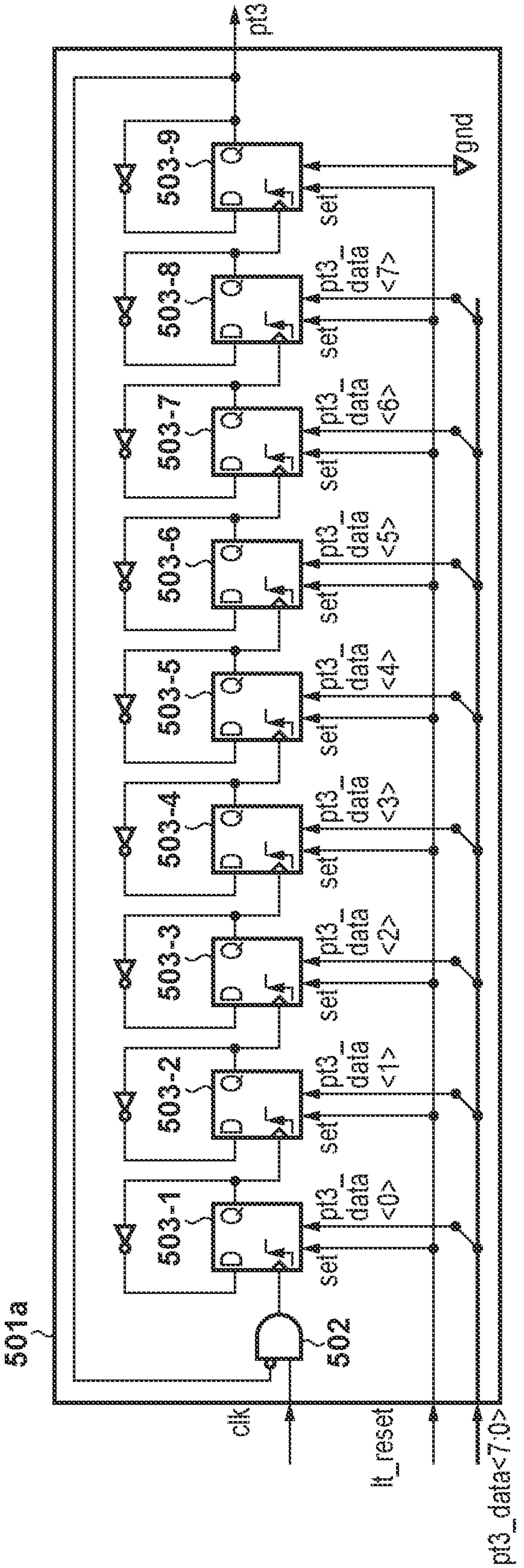
FIG. 9 is a circuit diagram showing the detailed arrangement of a counter integrated in the drive signal generation circuit shown in FIG. 8.

FIG. 9 is a circuit diagram showing the detailed arrangement of a counter integrated in the drive signal generation circuit shown in FIG. 8. Note that four counters integrated in the drive signal generation circuit shown in FIG. 8 have the same arrangement. FIG. 9 shows only the arrangement of a counter 501*a*. In this example, the counter is formed by an asynchronous 9-bit down counter but may be formed by a synchronous counter. Signal timings are the same as in the first and second embodiments, as already described with reference to FIG. 6, and a description thereof will be omitted.

As shown in FIGS. 8 and 9, the counter 501*a* sets pt3_data<7:0> as data of a drive signal he in each of flip-flop circuits 503-1 to 503-9 of the counter 501*a* at a timing when a latch reset signal lt reset is set to Hi. As in the first and second embodiments, the counter 501*a* counts using a clock signal clk used for data transfer. Since the counter 501*a* is a down counter, it counts down for each input of a clock signal pulse, all the 9 bits are "0", and a carry signal output at the next leading edge is set as a signal pt3.

If the signal pt3 is set to Hi, the signal pt3 is fed back to another input terminal of an AND circuit 502 to which the clock signal clk is input, thereby blocking the clock signal input to the counter 501*a* (the flip-flop circuit of the next stage). In this way, the signal pt3 is generated. Note that the same applies to signals pt2 to pt0 generated by other counters 501*b* to 501*d*.

A step of generating a drive signal he1 from the four signals pt3 to pt0 and a step of outputting various signals from a switching signal generation circuit 117 are the same as in the first and second embodiments.

If the signal pt0 outputs Hi and the final edge of the drive signal he1 falls, the latch reset signal lt_reset is set to Hi, and pt3_data<7:0> as data of the drive signal is set again in the counter 501*a*. A subsequent operation is the same as that when generating the drive signal he1, thereby outputting the drive signal he2.

As described above, even if the arrangement of the drive signal generation circuit is different, it is possible to obtain the same effect as in the first embodiment. As described in the second embodiment, by adding flip-flop/latch circuits 401 and 402 and a selector 403 to the drive signal generation circuit shown in FIG. 8, the pulse widths of the drive signals he1 and he2 can be changed as in the second embodiment.

Note that in this embodiment as well, the counter is operated for two cycles in one drive signal generation circuit. However, if the pulse width of the drive signal he is sufficiently small with respect to a block period 201, the counter may be operated for three or more cycles. In this case, it is necessary to increase the number of selection channels of the selector 403, and to add flip-flop/latch circuits accordingly.

Note that in the above-described embodiments, the printhead that discharges ink and the printing apparatus have been described as an example. However, the present invention is not limited to this. The present invention can be applied to an apparatus such as a printer, a copying machine, a facsimile including a communication system, or a word processor including a printer unit, and an industrial printing apparatus complexly combined with various kinds of processing apparatuses. In addition, the present invention can also be used for the purpose of, for example, biochip manufacture, electronic circuit printing, color filter manufacture, or the like.

The printhead described in the above embodiments can also be considered as a liquid discharge head in general. The substance discharged from the head is not limited to ink, and can be considered as a liquid in general.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-096246, filed May 22, 2019, which is hereby incorporated by reference herein in its entirety.

What is claimed is:

1. An element substrate, including:

a plurality of print elements;

a plurality of drive elements configured to drive the plurality of print elements, for driving the plurality of drive elements by dividing the plurality of drive elements into a plurality of blocks; and a generation circuit configured to generate (i) a first drive signal that drives drive elements belonging to a first group among the plurality of drive elements, and (ii) a second drive signal that drives drive elements belonging to a second group among the plurality of drive elements, by switching an output destination of a signal generated based on a signal from outside of the element substrate, using a first selector within one block period in the driving the plurality of drive elements by dividing the plurality of drive elements into the plurality of blocks, wherein the first drive signal and the second drive signal are generated by the same generation circuit, the one block period is an input period of a latch signal which is input to the generation circuit and the plurality of print elements, and the first drive signal and the second drive signal are generated at different timings within the one block period, wherein the generation circuit includes:

a counter configured to count a clock signal a predetermined number of times;

a first comparator configured to compare a first value included in a data signal with a count value by the counter;

a second comparator configured to compare a second value included in the data signal with the count value by the counter;

a signal generation circuit configured to generate a single-pulse signal based on an output from the first comparator and an output from the second comparator; and a reset circuit configured to reset, when the counter counts the clock signal the predetermined number of times, the count of the counter, the output from the first comparator and the output from the second comparator, and wherein within a half of the one block period, the counter outputs, as the first drive signal, the single-pulse signal generated by performing counting the predetermined number of times, and within another half of the one block period, the counter outputs, as the second drive signal, the single-pulse signal generated by performing counting the predetermined number of times.

2. The element substrate according to claim 1, further comprising a plurality of print element arrays, each formed by arraying the plurality of print elements, wherein a print element array to which the print elements connected to the drive elements belonging to the first group belong is different from a print element array to which the print elements connected to the drive elements belonging to the second group belong.

3. The element substrate according to claim 1, further comprising a plurality of print element arrays, each formed by arraying the plurality of print elements, wherein a print element array to which the print elements connected to the drive elements belonging to the first group belong is same as a print element array to which the print elements connected to the drive elements belonging to the second group belong.

4. The element substrate according to claim 1, wherein the generation circuit further includes:

a first latch circuit configured to input the data signal for generating the single-pulse signal used to generate the first drive signal;

a second latch circuit configured to input the data signal for generating the single-pulse signal used to generate the second drive signal; and a second selector configured to select one of a signal from the first latch circuit and a signal from the second latch circuit, and output the signal to the first comparator and the second comparator.

5. The element substrate according to claim 4, wherein the first selector selects one of an output of the first drive signal and an output of the second drive signal in accordance with reset of the reset circuit.

6. The element substrate according to claim 1, further comprising:

a first receiver configured to receive a first differential signal transmitted in accordance with an LVDS method and generate a data signal; and a second receiver configured to receive a second differential signal transmitted in accordance with the LVDS method and generate a clock signal.

7. An element substrate, including:

a plurality of print elements;

a plurality of drive elements configured to drive the plurality of print elements, for driving the plurality of drive elements by dividing the plurality of drive elements into a plurality of blocks;

a generation circuit configured to generate (i) a first drive signal that drives drive elements belonging to a first group among the plurality of drive elements, and (ii) a second drive signal that drives drive elements belonging to a second group among the plurality of drive elements, by switching an output destination of a signal generated based on a signal from outside of the element substrate, using a first selector within one block period in the driving the plurality of drive elements by dividing the plurality of drive elements into the plurality of blocks, wherein the first drive signal and the second drive signal are generated by the same generation circuit, the one block period is an input period of a latch signal which is input to the generation circuit and the plurality of print elements, and the first drive signal and the second drive signal are generated at different timings within the one block period;

a first counter configured to count a clock signal by a number of pulses indicated by a first value included in a data signal;

a second counter configured to count the clock signal by a number of pulses indicated by a second value included in the data signal;

a signal generation circuit configured to generate a single-pulse signal based on an output from the first counter and an output from the second counter; and a reset circuit configured to reset, when the second counter counts the clock signal by the number of pulses indicated by the second value, the first counter and the second counter, and wherein the signal generation circuit outputs, within a half of the one block period, as the first drive signal, the single-pulse signal generated by counting of the first counter and the second counter, and within another half of the one block period, as the second drive signal, the single-pulse signal generated by counting of the first counter and the second counter.

8. The element substrate according to claim 7, wherein the generation circuit further includes:

a first latch circuit configured to input the data signal for generating the single-pulse signal used to generate the first drive signal;

a second latch circuit configured to input the data signal for generating the single-pulse signal used to generate the second drive signal; and a second selector configured to select one of a signal from the first latch circuit and a signal from the second latch circuit, and output the signal to the first counter and the second counter.

9. The element substrate according to claim 8, wherein the first selector selects one of an output of the first drive signal and an output of the second drive signal in accordance with reset of the reset circuit.

10. A printing apparatus for printing on a print medium using, as a printhead for discharging a liquid as ink, a liquid discharge head for discharging the liquid, wherein the liquid discharge head comprises:

an element substrate including a plurality of print elements and a plurality of drive elements configured to drive the plurality of print elements, and configured to drive the plurality of drive elements by dividing the plurality of drive elements into a plurality of blocks; and a plurality of orifices configured to discharge the liquid, wherein the element substrate further comprises a generation circuit configured to generate (i) a first drive signal that drives drive elements belonging to a first group among the plurality of drive elements, and (ii) a second drive signal that drives drive elements belonging to a second group among the plurality of drive elements, by switching an output destination of a signal generated based on a signal from outside of the element substrate, using a first selector within one block period in the driving the plurality of drive elements by dividing the plurality of drive elements into the plurality of blocks, the first drive signal and the second drive signal are generated by the same generation circuit, the one block period is an input period of a latch signal which is input to the generation circuit and the plurality of print elements, the first drive signal and the second drive signal are generated at different timings within the one block period, and the ink is discharged from the plurality of orifices by driving the plurality of print elements, wherein the generation circuit includes:

a counter configured to count a clock signal a predetermined number of times;

a first comparator configured to compare a first value included in a data signal with a count value by the counter;

a second comparator configured to compare a second value included in the data signal with the count value by the counter;

a signal generation circuit configured to generate a single-pulse signal based on an output from the first comparator, and an output from the second comparator; and a reset circuit configured to reset, when the counter counts the clock signal the predetermined number of times, the count of the counter, the output from the first comparator, and the output from the second comparator, and wherein within a half of the one block period, the counter outputs, as the first drive signal, the single-pulse signal generated by performing counting the predetermined number of times, and within another half of the one block period, the counter outputs, as the second drive signal, the single-pulse signal generated by performing counting the predetermined number of times.

* * * * *